Aug. 27, 1935.  A. L. CLEMENTS  2,012,303
APPARATUS FOR MAKING CARPET CUSHIONS
Filed March 2, 1934  4 Sheets-Sheet 1

INVENTOR
Arthur L. Clements
BY
Quarles & French
ATTORNEYS

Aug. 27, 1935. A. L. CLEMENTS 2,012,303
APPARATUS FOR MAKING CARPET CUSHIONS
Filed March 2, 1934 4 Sheets-Sheet 2

INVENTOR
Arthur L. Clements
BY
Quarles & French
ATTORNEYS

Aug. 27, 1935. A. L. CLEMENTS 2,012,303
APPARATUS FOR MAKING CARPET CUSHIONS
Filed March 2, 1934 4 Sheets-Sheet 3
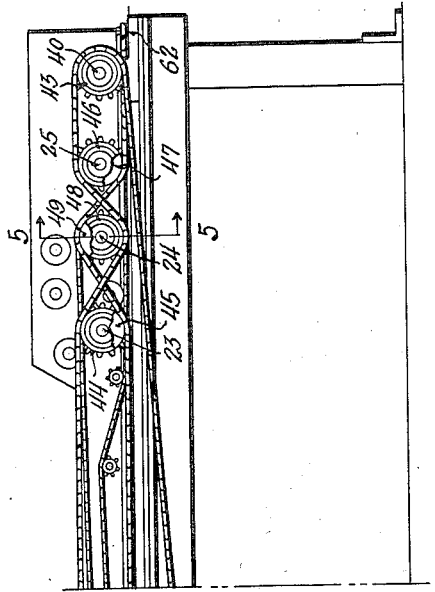
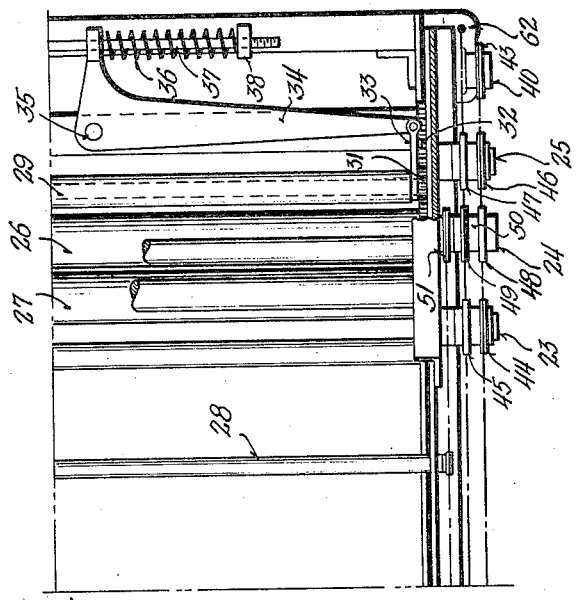
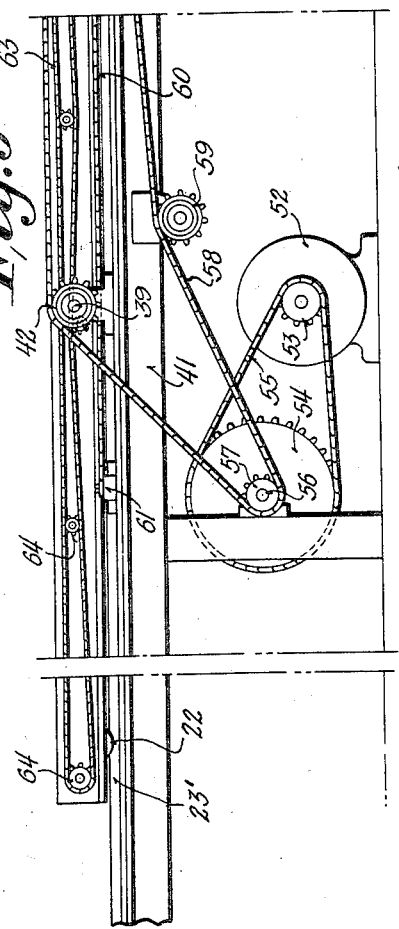
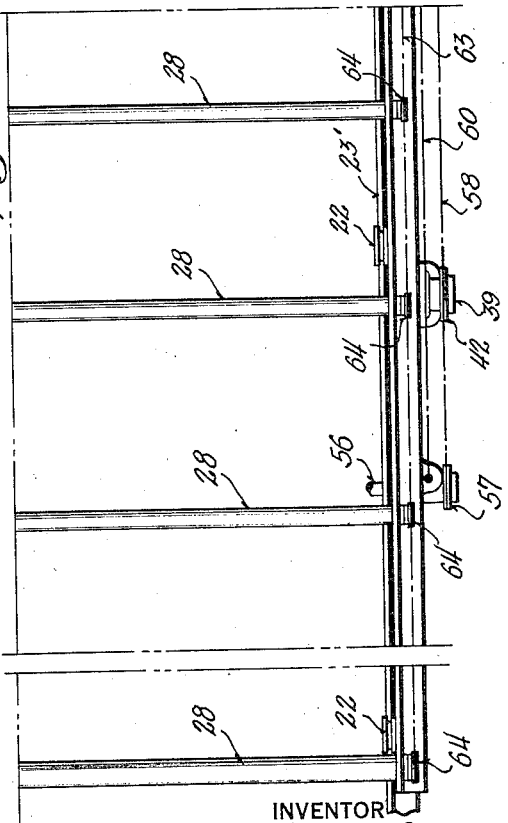
Fig.3
Fig.4
INVENTOR
Arthur L. Clements
BY
Marles & French
ATTORNEYS Aug. 27, 1935. A. L. CLEMENTS 2,012,303
APPARATUS FOR MAKING CARPET CUSHIONS
Filed March 2, 1934 4 Sheets-Sheet 4
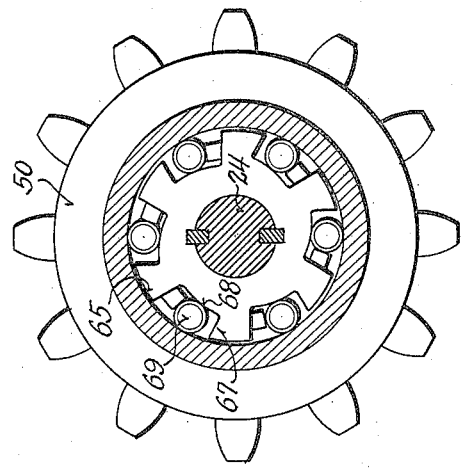
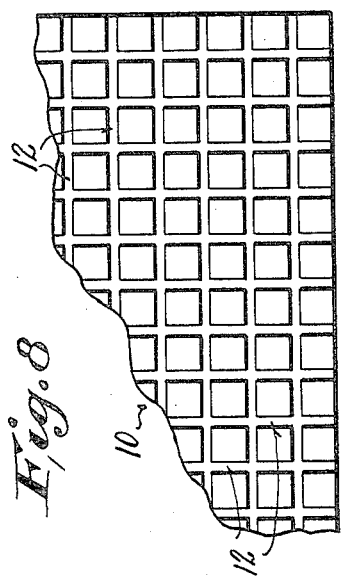
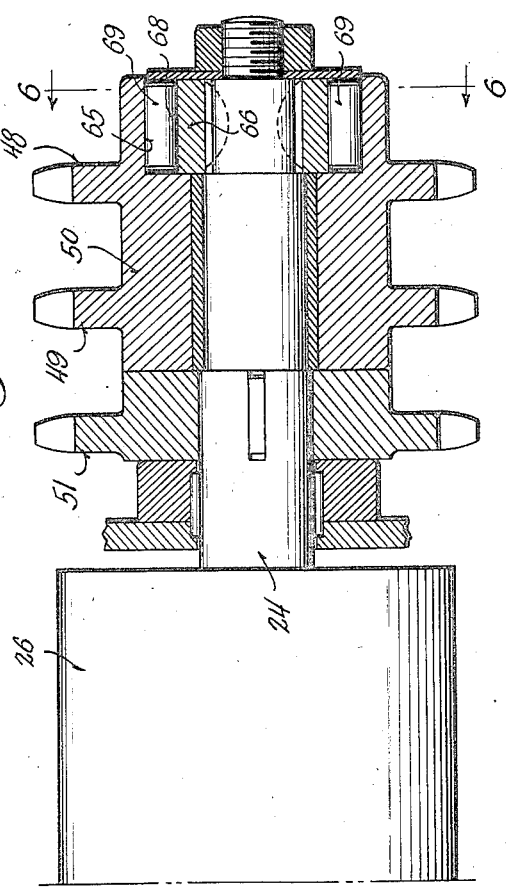
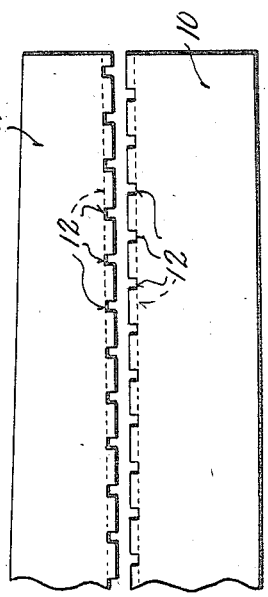
INVENTOR
Arthur L. Clements
BY Quarles & French
ATTORNEYS Patented Aug. 27, 1935

2,012,303

UNITED STATES PATENT OFFICE 2,012,303

APPARATUS FOR MAKING CARPET CUSHIONS

Arthur L. Clements, Chicago, Ill., assignor to American Hair & Felt Company, Chicago, Ill., a corporation of Delaware Application March 2, 1934, Serial No. 713,650

10 Claims. (Cl. 28—14)

The invention relates to an apparatus for making carpet cushions or underliners for carpets, rugs, etc., and more particularly where such cushion has a cellular structure on both sides thereof.

Ordinarily, where one side of the cushion is plain, it is a simple matter to feed the cushion material to and remove it from the felting apparatus, but where impressions are given to both sides of the material, special problems are involved in presenting the cushion material to the felter plates and thereafter removing the finished material from the same and particularly where the material is handled as a continuous web. According to this invention the material to be felted is introduced between the felter plates upon a conveyor which is bodily movable, in whole or in part, into and out of the space between the felter plates, and the finished material is thereafter moved out from between the felter plates while an unfelted section connected thereto is positioned between said plates.

The invention further consists in the apparatus as hereinafter set forth and more particularly defined by claims at the conclusion hereof.

In the drawings:

Fig. 1A is a view similar to Fig. 1 and is a continuation thereof, parts being broken away and parts being shown in section;

Fig. 2A is a view similar to Fig. 2 and a continuation thereof, parts being broken away;

Fig. 3 is a detail side elevation view of a portion of the apparatus showing the conveyor drive;

Fig. 4 is a half plan view of the portion of the apparatus embodying the conveyor, parts being broken away;

Fig. 5 is a detail sectional view taken on the line 5—5 of Fig. 3;

Fig. 6 is a detail sectional view taken on the line 6—6 of Fig. 5;

Fig. 7 is a detail side elevation view of the felter plates after the removal of the feeding means;

Fig. 8 is a detail plan view of part of one of the felter plates.

The cushioning material may be made up of bats of animal hair or other suitable feltable fibres or mixtures of animal hair and other fibres preferably disposed on opposite sides of an intermediate reinforce of coarse mesh fabric, such as burlap, with adhesive between said bats and burlap as more particularly set forth in U. S. Patent No. 1,508,221 dated September 9, 1924 to Alfred H. Gallagher; or said bats may be secured to said fabric by a preliminary punching operation. The material forming the cushion in the present instance is shown in rolls in Fig. 1, the rolls M designating the bats of feltable fibres and the roll I the intermediate reinforcement. These materials are unwound from their rollers as the making of the cushion material progresses and fed into the space between the felter plates of the felting apparatus and after being felted, the finished material is taken out of the machine and carried up on a delivery belt R to a suitable place of deposit.

Figure 1:
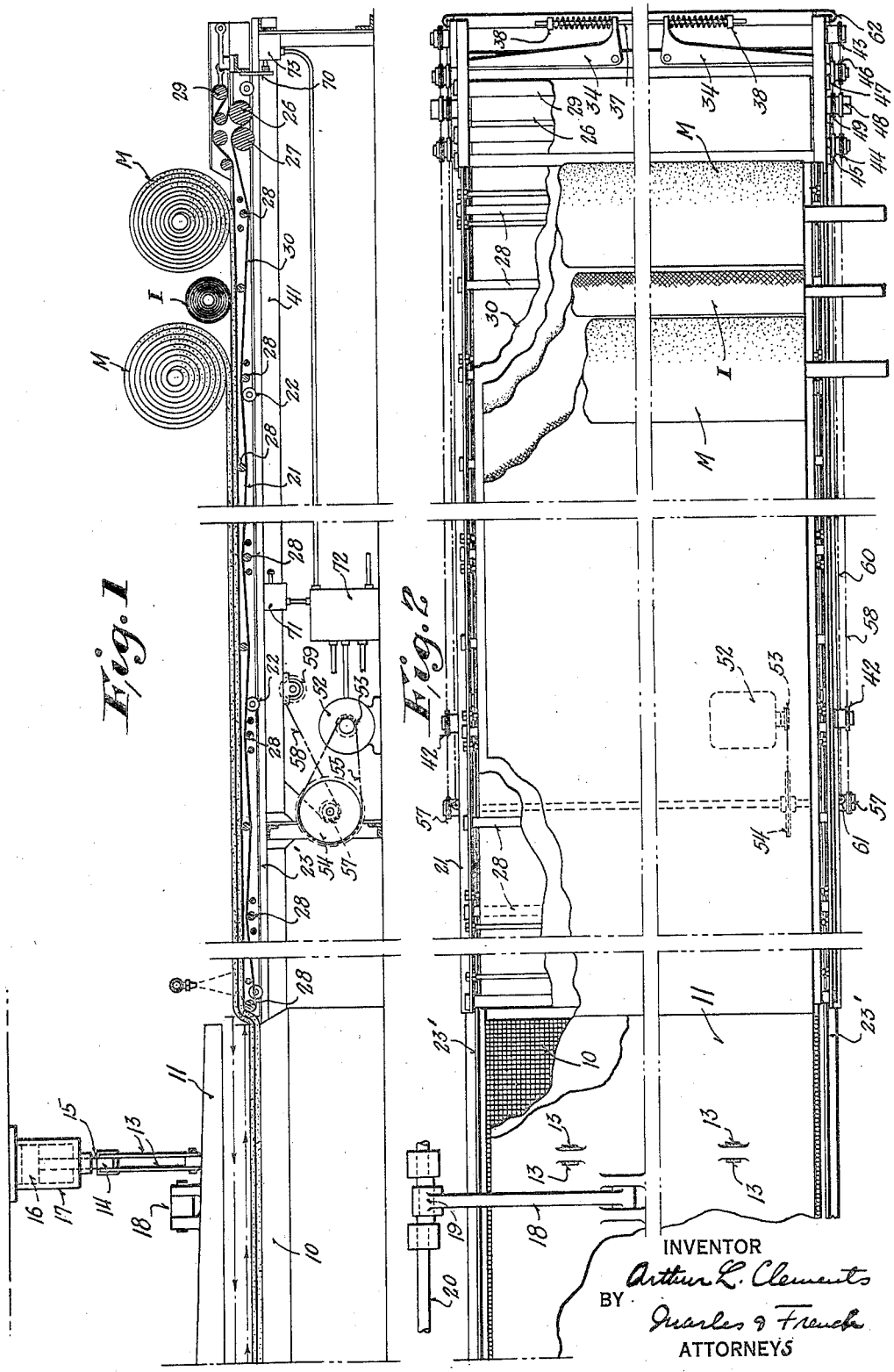
Fig. 1 is a side elevation view of a portion of an apparatus embodying the invention, parts being broken away and parts being shown in section.

The felting apparatus includes a relatively stationary plate 10 and a vibratory plate 11 disposed above and movable relative to said stationary plate. Each of these plates has grooves 12 cut in its face, so as to form elevations and depressions in the material being felted, and since each of the plates form such elevations and depressions the material after the felting operation will be interlocked with one of said plates until forcibly released therefrom. The elevations and depressions on one plate are preferably offset from those of the other plate, so that in the completed material the ridges formed by the elevated portions of the material on one of its surfaces will be offset or staggered with reference to the ridges on its opposite surface. The plates 10 and 11 are usually hollow castings and heated with steam introduced therein from any suitable source through suitable pipe connections. The upper plate 11 is shown in Figs. 1 and 1A as suspended by links 13 connected to bars 14, each of the bars being connected to an hydraulically operated member 15 having a piston 16 working in a cylinder 17, so that said plate may be raised and lowered, said plate being connected by eccentric straps 18 to eccentrics 19 on a rotatable shaft 20. The rotation of said shaft will through the eccentrics 19 and their connections to the plate 11 impart a vibratory or reciprocatory motion to said plate.

For advancing the material into position between the felter plates 10 and 11 for their action thereon, I have provided a conveyor which in the present instance includes a travelling frame 21 provided with spaced sets of grooved wheels 22 running on spaced rails 23'. This frame has shafts 23, 24, and 25 suitably journalled thereon, the shaft 24 carrying a roller 26 disposed adjacent to roller 27 suitably journalled in said frame. The frame also carries a series of transversely disposed rollers 28, and one of these rollers is mounted at the front of the conveyor frame and the take-up or tension roller 29 is mounted at the rear of said frame. An endless conveyor 30 runs over the rollers 26, 27, and 29. The roller 29 is journalled on a shaft having a gear 31 at each end meshing with a rack 32 at the same ends and urged rearwardly along said racks 32 by the connection of a link 33 at each end of said roller carrying shaft with one end of a lever 34 pivoted intermediate its ends to the frame at 35 and engaging at its other end with a tension spring 36 adjustably secured under tension by a rod 37 passing through the ends of both levers 34 and threaded to receive the tension adjusting nuts 38.

Shafts 39 and 40 are mounted on the fixed frame 41 of the machine and carry sprockets 42, and 43. The shaft 23 carries sprockets 44 and 45. The shaft 25 carries sprockets 46 and 47. The shaft 24 has a pair of sprockets 48 and 49 mounted on a hub 50 connected to the shaft 24 through an over-running clutch hereinafter described, and said shaft also has a sprocket 51 keyed thereon, these last named sprockets being shown more in detail in Fig. 5. A reversible electric motor 52 is connected by sprockets 53, 54, and chain 55 with the transmission shaft 56 carrying a sprocket 57 and an endless drive chain 58 runs over the sprocket 57, sprockets 42, 44, 48, 46, and 43 and also over an idler sprocket 59. It is to be noted that this chain runs over the under portion of the sprocket 48 and over the upper part of sprockets 44 and 46. A rack chain 60 is fixed at its ends 61 and 62 to the fixed frame of the machine and meshes with the sprockets 45, 49, and 47, said chain engaging the under portion of the sprockets 45 and 47 and the upper portion of the sprocket 49. An endless chain 63 engages sprockets 64 and also the sprocket 51 on the shaft 24 from which the chain is driven when the shaft 24 is turned. The drive thus far described in connection with the conveyor is at one side of the machine and a similar drive from the shaft 56 for the shafts and rollers of the conveyor is provided by chains at the other side of the machine and similar to the chains 58, 60, and 63.

The over-running or one way clutch previously mentioned includes a driven portion 65 on the hub 50 for the sprockets 49 and 48, an actuator 66 keyed to the shaft 24 and provided with recesses 67 having inclined surfaces 68, and rollers 69 mounted in said recesses and automatically wedged between said surfaces and driven when said hub 50 rotates anti-clockwise as viewed in Fig. 6.

Figure 2:
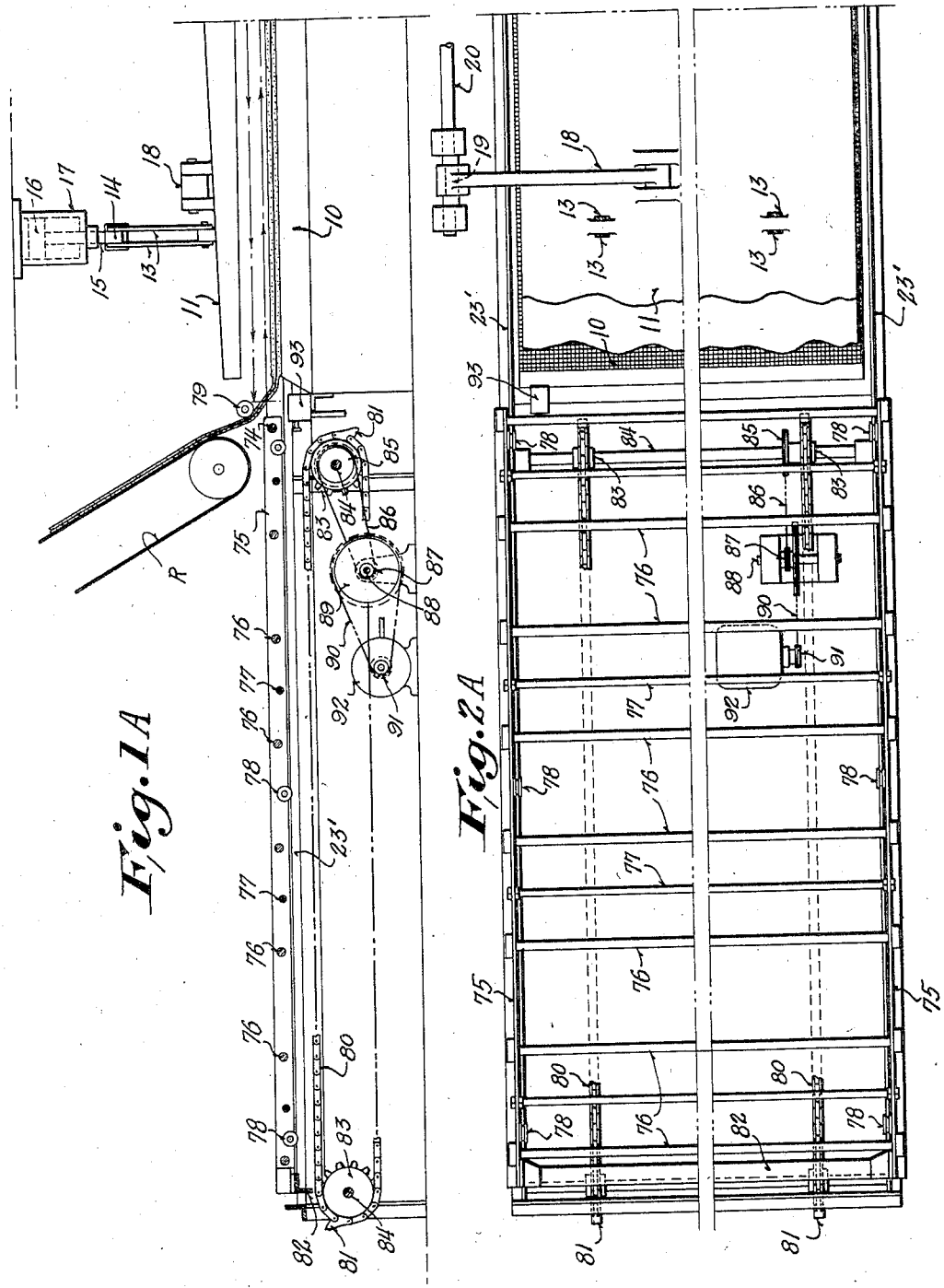
Fig. 2 is a plan view of a portion of the apparatus embodying the invention, parts being broken away.

With the above construction rotation of the shaft 56 in anti-clockwise direction, by the drive from the motor 52, drives the chains 58 so as to turn the sprockets 42, 44, and 46 in a similar direction and thus advance them along the fixed chain or rack 60 and consequently move the whole conveyor forwardly or toward the left as viewed in Figs. 1, 2, and 3, the sprockets 49 and 48 under these conditions running freely.

The conveyor in advancing brings the materials M and I, to be felted together, into the space between the felter plates and when the conveyor reaches the end of its forward movement, a stop 70 on the movable conveyor frame operates a stop switch 71 to stop the motor 52. Thereafter suitable switch mechanism in the control box 72 reverses the drive of the motor 52, and this, through the connections previously described, reverses the drive for the chains 58 and causes these chains to rotate the sprockets 44 and 46 clockwise and the sprockets 48 and 49 counter-clockwise, thereby producing an automatic engagement of the hub portion 50 for the sprockets 48 and 49 through the clutch previously described, and thereby driving the shaft 24 and the sprockets 51 which, through the chains 63, drive the sprockets 64 and the rollers 28, so that the endless conveyor 30 on the frame 21 is driven forwardly or toward the left as the carriage or frame 21 moves rearwardly, the conveyor moving forwardly at the same speed as the carriage moves rearwardly, so that the material itself is not moved but is simply allowed to drop from the conveyor onto the lower felter plate 10. The rearward movement of the conveyor ceases when the stop 70 operates a stop switch 73 to stop the motor 52. Thus in the above described construction the whole conveyor is moved so as to bring a portion thereof into the space between the felter plates, and the material thereon is deposited between said plates as the conveyor is moved out of said space.

When the material to be felted has been deposited by the conveyor in the space between the plates 10 and 11, the plate 11 is lowered to a working position and is started to vibrate on the rotation of the shaft 20 and is kept in this state until the fibres of the material have been felted together to the desired extent. Thereafter the plate 11 through operation of the hydraulic jacks previously described is moved to its raised position and this leaves the felted section of the material in interlocked relation with the lower plate 10, the same being shown in this position in Figs. 1 and 1A and means, now to be described, are provided for disengaging the material from said plate.

The means for disengaging the felted material includes a stripper member 74 forming a part of a support and conveyor including side frames 75 and transversely extending material supporting members or bars 76 and tie bars 77, said frame members provided with grooved wheels 78 running on spaced rails or tracks that form a continuation of the rails 23'. The operating plane of this conveyor is such that as the same is advanced toward the right, when viewed in Fig. 1A, into the space between the felter plates 11 and 10 the member 74 will engage under the finished felted material and gradually lift and disengage the same from the lower plate 10 as said conveyor continues to move toward the left and the material thus loosened from the plate 10 is free to pass over the stripper member 74 and be supported upon the supporting members 76, so that when the whole felted section is loosened from the lower plate 10, it is supported by this conveyor whose forward end is then in contact with or close to the forward end of the feeding-in conveyor, so that when said feeding-in conveyor advances into the space between the felter plates, the stripping conveyor will be moved out of said space and thus carry the finished material with it, and as the material is thus advanced it is taken off of the stripping conveyor through the action of the delivery belt R, the material under these conditions being elevated and passing under a guide roller 79 disposed adjacent the lower end of the delivery conveyor R. For moving the stripping conveyer on its stripping operation an endless drive chain 80 is provided with drive lugs 81 adapted to intermittently and successively engage a stop 82 on the rear end portion of the stripping conveyor, so that when the upper run of the chain 80 is driven toward the right, one of the lugs 81 will engage the stop 82 of the conveyor and form a driving connection therewith which on further movement of the chain 80 will move the stripping conveyor forwardly substantially the same amount that the feeding-in conveyor moves rearwardly and into a position in which the forward end of the stripping conveyor contacts with the forward end of the feeding-in conveyor. The chain 80 runs over sprockets 83 on shafts 84, and one of these shafts has a drive sprocket 85 mounted thereon connected by a chain 86 to the sprocket 87 on an intermediate shaft 88 carrying a large reduction sprocket 89 connected by chain 90 to a sprocket 91 on the drive shaft of an electric motor 92. The drive for this motor is controlled through suitable connections from the control switch box 72, so that the motor is started after the felter plate 11 is moved to a raised position and the current to the motor is automatically shut off when the stripper conveyor has moved to disengage the material by the engagement of the stop 82 with a stop switch 93. The return movement of the stripping conveyor is effected by the movement of this conveyor by the feeding-in conveyor which pushes the last named stripping conveyor ahead of it as said feeding-in conveyor moves into the space between the felter plates 10 and 11.

From the foregoing description it will be noted that the felting material is produced by a continuous process in which successive sections of the material are subjected to the action of the felter plates and removed therefrom while the new material is being moved into position for action thereon. The material forming the cushion may be laid up upon the feeding-in conveyor by hand or may be supplied to the same through suitable mechanism.

I desire is to be understood that this invention is not to be limited to the specific details hereinbefore set forth except in so far as such limitations are included in the claims.

What I claim as my invention is:

1. The combination with a felting apparatus having oppositely disposed relatively movable felter plates, of a conveyor for feeding material to be felted into the space between said felter plates, and means distinct from said plates and movable between one of said plates and the felted material for loosening said material from said plate.

2. The combination with a felting apparatus having oppositely disposed relatively movable felter plates, of a conveyor for feeding material to be felted into the space between said plates, and means distinct from said plates and movable between one of said plates and the felted material for loosening said material from said plate and supporting said loosened material in a position spaced from said plate.

3. The combination with a felting apparatus having oppositely disposed relatively movable felter plates, of a carrier for the material to be felted, means for moving a part of said carrier into the space between said felter plates to position material therein and for removing said part from said space, and means movable between one of said plates and the felted material for loosening said felted material from said plate.

4. The combination with a felting apparatus having oppositely disposed relatively movable felter plates, of a conveyor for the material to be felted including an endless apron, means for moving a portion of said apron into and out of the space between said felter plates, means for driving said apron in a forward feeding direction as the apron is moved out of said space, and means, movable between one of said plates and the felted material, for loosening said material from said plate.

5. The combination with a felting apparatus having oppositely disposed relatively movable felter plates, of means for depositing material to be felted in the space between said plates, means for stripping the felted material from one of said plates, and means for supporting the material stripped from said plate, said supporting means being movable out of the space between said plates as material to be felted is moved into the space between said plates.

6. The combination with a felting apparatus having oppositely disposed relatively movable felter plates, of a conveyor for the material to be felted including a movable bed and a reciprocatory frame to carry said bed into and out of feeding relation with said plates, means for reciprocating said frame, means for moving said bed as the frame is moved out of feeding relation with said plates whereby to lay said material from said bed upon one of said plates, and means, movable between one of said plates and the felted material for loosening said material from said plate.

7. The combination with a felting apparatus having oppositely disposed relatively movable felter plates, of a carrier for the material to be felted, means for moving said carrier to deposit said material between said plates, stripping means movable between said plates to loosen the felted material from one of them, said carrier moving means adapted to move said stripping means in one direction.

8. The combination with a felting apparatus having oppositely disposed relatively movable felter plates, of a feeding in carrier, a delivery carrier, means for moving said feeding in carrier to deliver material to the space between the plates while moving said delivery carrier with felted material thereon out of said space, means for moving said delivery carrier into a material receiving position, and a stripper associated with said delivery carrier for loosening the felted material from one of said plates.

9. The combination with a felting apparatus having oppositely disposed relatively movable felter plates, of a conveyor for the material to be felted including a movable bed and a reciprocatory frame to carry said bed into and out of feeding relation with said plates, means for moving said bed as the frame is moved out of feeding relation with said plates whereby to lay said material from said bed upon one of said plates, stripping means movable between one of said plates and the felted material, delivery means to receive the stripped material, means for moving said delivery means into the space between said plates and to a position adjacent said reciprocatory frame, said reciprocatory frame on its feeding in movement engaging said delivery means and moving it outwardly.

10. The combination with a felting apparatus having oppositely disposed relatively movable felter plates, of a conveyor for the material to be felted including a movable bed and a reciprocatory frame to carry said bed into and out of feeding relation with said plates, drive means for said frame operable during the outstroke of said frame to move said bed at the same speed as said frame but in the opposite direction and automatically disconnectible from said bed during the instroke of said frame, and means for removing the felted material from between said plates.

ARTHUR L. CLEMENTS.